US009955417B2

(12) United States Patent
Gao et al.

(10) Patent No.: US 9,955,417 B2
(45) Date of Patent: Apr. 24, 2018

(54) METHOD FOR REALIZING AWAKENING OF SMALL CELL, ACCESS NETWORK ELEMENT DEVICE AND COMPUTER STORAGE MEDIUM (71) Applicant: ZTE Corporation, Shenzhen (CN)

(72) Inventors: Yin Gao, Shenzhen (CN); Feng Xie, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 79 days.

(21) Appl. No.: 15/025,647

(22) PCT Filed: Apr. 16, 2014

(86) PCT No.: PCT/CN2014/075535
§ 371 (c)(1),
(2) Date: Mar. 29, 2016

(87) PCT Pub. No.: WO2014/176978
PCT Pub. Date: Nov. 6, 2014

(65) Prior Publication Data
US 2016/0242112 A1 Aug. 18, 2016

(30) Foreign Application Priority Data
Sep. 29, 2013 (CN) .......................... 2013 1 0461387

(51) Int. Cl.
H04W 52/02 (2009.01)
H04W 72/04 (2009.01)
(Continued)

(52) U.S. Cl.
CPC ... *H04W 52/0206* (2013.01); *H04W 36/0083* (2013.01); *H04W 72/0406* (2013.01);
(Continued)

(58) Field of Classification Search
CPC ......... H04W 52/0206; H04W 36/0083; H04W 84/042; H04W 76/046; H04W 72/0406; H04W 36/165
See application file for complete search history.

(56) References Cited

U.S. PATENT DOCUMENTS

2012/0015657 A1* 1/2012 Comsa .............. H04W 36/0094
455/436
2012/0106349 A1 5/2012 Adjakple
2016/0174150 A1 6/2016 Comsa et al.

FOREIGN PATENT DOCUMENTS

CN 1424859 A 6/2003
CN 102202309 A 9/2011
(Continued)

OTHER PUBLICATIONS

International Search Report in international application No. PCT/CN2014/075535, dated Jul. 18, 2014.
(Continued)

*Primary Examiner* — Mohammad S Anwar
(74) *Attorney, Agent, or Firm* — Oppedahl Patent Law Firm LLC (57) ABSTRACT Provided are a method for realizing the awakening of a small cell, an access network element device and a computer storage medium. The method comprises: an access network element device receiving information about one or more small cells that enter a sleep state which is reported by a user equipment, wherein the information about the small cell comprises at least one of the following information: current datarate information about the user equipment, cell type information, cell supporting mode information and cell broadcasting PLMN information; the access network element device determining a target small cell needs to be awakened in accordance with the information about the asleep small cell reported by the user equipment; and the
(Continued)

access network element device notifying the access network element device corresponding to the target small cell to awaken the target small cell through a ground interface message.

11 Claims, 3 Drawing Sheets

(51) Int. Cl.
*H04W 76/04* (2009.01)
*H04W 84/04* (2009.01)
*H04W 36/00* (2009.01)
*H04W 88/08* (2009.01)
*H04W 36/16* (2009.01)

(52) U.S. Cl.
CPC ....... *H04W 76/046* (2013.01); *H04W 84/042* (2013.01); *H04W 36/165* (2013.01); *H04W 88/08* (2013.01); *Y02B 60/50* (2013.01)

(56) References Cited

FOREIGN PATENT DOCUMENTS

| | | |
|---|---|---|
| CN | 102238663 A | 11/2011 |
| CN | 102256233 A | 11/2011 |
| CN | 102378172 A | 3/2012 |
| CN | 102598776 A | 7/2012 |
| CN | 102685713 A | 9/2012 |
| CN | 102687557 A | 9/2012 |
| CN | 102860095 A | 1/2013 |
| EP | 2416609 A1 | 2/2012 |

OTHER PUBLICATIONS

English Translation of the Written Opinion of the International Search Authority in international application No. PCT/CN2014/075535, dated Jul. 18, 2014.

Supplementary European Search Report in European application No. 14791977.3, dated Sep. 21, 2016.

* cited by examiner

METHOD FOR REALIZING AWAKENING OF SMALL CELL, ACCESS NETWORK ELEMENT DEVICE AND COMPUTER STORAGE MEDIUM

TECHNICAL FIELD

The disclosure relates to the field of network communications, and in particular to a method and access network element device for implementing small cell awakening under a small cell network environment, and a computer storage medium.

BACKGROUND

With the development of wireless multimedia services, people have an increasing demand for high data rate and good user experience, and raise a higher demand for system capacity and coverage of a conventional cellular network. In a conventional Long Term Evolution (LTE) cellular network, a Macrocell serving as a unique access side network element provides an access service for User Equipment (UE). However, to meet the demand of a user for higher data rate and to improve the spectral efficiency of the cellular network, a 3rd Generation Partnership Project (3GPP) introduces a Small Cell (SC) or a Small Cell Enhancement (SCE); the SC serving as a supplement of a Macro evolved NodeB (eNB) provides an access service for the UE. The SC originates from a Femtocell initially designed for a family scene; the small cell is relatively small with respect to a conventional Macro eNB, and has the characteristics: miniaturization, low-emission power, high controllability, intelligence and flexibility in networking. With respect to the emission power, the typical emission power of the small cell is between 100 mW and 5 W; with respect to the weight, the general weight of the small cell is between 2 kg and 10 kg; with respect to a networking mode, the small cell supports backhaul in various technologies including Digital Subscriber Line (DSL), optical fibre, Wireless Local Area Network (WLAN) and cellular technology, and further has self-organization and self-optimization functions such as automatic neighbouring cell discovering, self-configuration and the like.

Figure 1:
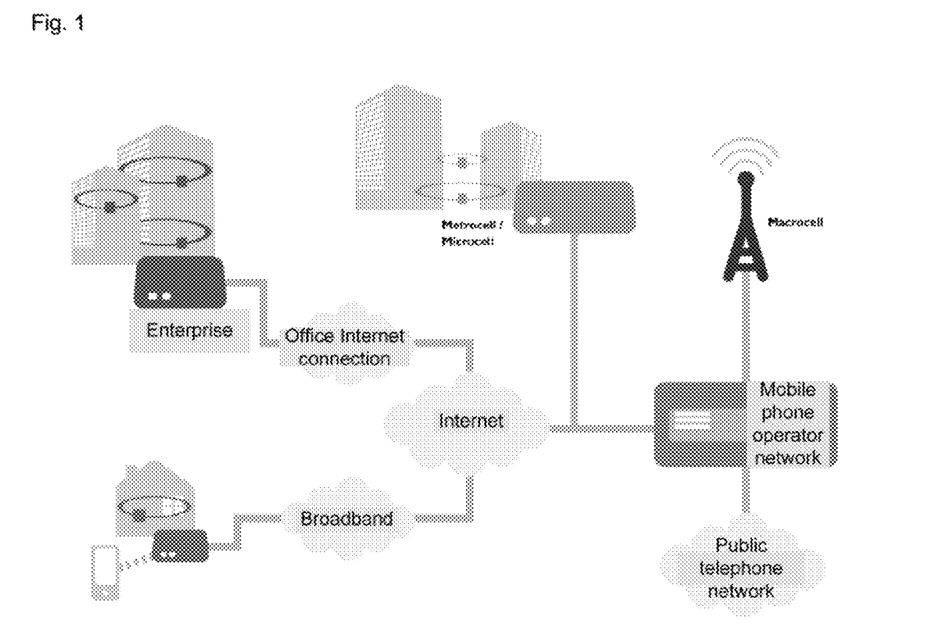
FIG. 1 is a schematic diagram of a small cell network environment in the prior art.

The small cell has four types of product forms: the first one is called Femtocell, which is mainly applied to family and enterprise environments; the second one is called Picocell, which is applied to indoor public places such as an airport, a train station and a shopping centre; the third one is called Microcell, which is applied to downtowns where a Macro eNB cannot be deployed due to limited spaces, or villages; the last one is called Metrocell, which is mainly applied to hot spot regions in downtowns to reduce the capacity bottleneck, or applied to villages. As shown in FIG. 1, the environment of a small cell network is very complicated, and its quantity of eNB equipment of the small cell is orders of magnitude more than that of a conventional Macro eNB network.

Since September 2007 when the Sprint, the first one in the world, deploys Femtocell, small cells have been successfully deployed in forty-one networks of twenty-three nations; at present, more than 3,800,000 small cells have been deployed in the whole world mainly in the form of Femtocells (80%). However, from regional distribution, the small cells have been mainly distributed in America (the Sprint has deployed more than 900,000 small cells/the AT&T has deployed about 500,000 small cells), Europe, Japan and South Korea (there are 120,000 small cells deployed by the Softbank of Japan).

Under a hot-spot deployment scene, to achieve higher data rate and higher spectral efficiency, a large number of small evolved NodeBs (eNBs) are required to be concentrated in a region; in addition, a Macro eNB and the small eNBs may adopt different frequency points, and the small eNBs may probably adopt different frequency points. Particularly, in an indoor deployment scene, such as offices, malls and the like which are generally built in multi-floor buildings, different floors probably have small eNBs, and the working carrier frequencies of the small eNBs on different floors are probably different.

Under the environment of a home eNB, when there is no user accessing or a load is extremely low, the home eNB can fulfil the aim of saving energy by moving a user out of a cell and then closing the emission power of the cell or the eNB. Further, appropriate awakening of a cell of the home eNB is implemented by means of reporting of Proximity Indication (PI) information of UE. Under the environment of a small cell, since the small cell in an energy saving mode may be switched out or shut down the carrier wave emission power, even if the UE reports the PI information of the small cell, a measurement result cannot be reported unless the network side transmits a measurement control command after the small cell is awakened, and then the reporting of the measurement result enables the small cell to provide a normal service for the UE. At the present, some of mechanisms enable UE in an energy saving state to discover a small cell in the energy saving state; for example, by virtue of the design of a small cell discovering signal, the UE can sense information that the small cell is in the energy saving state; the UE can configure energy saving indication information (which indicates that the Small Cell is in the energy saving state), and report it to an eNB where a current serving cell is located. On the other hand, due to individual particularities of single and multiple users, when the capacity of a current network is limited, the small cells in the energy saving state are required to be awakened timely to provide services for the users. Therefore, how to enable the network side to accurately determine an appropriate target small cell to be awakened through information reported by the UE to avoid unnecessary awakening operation on an interface is a problem to be solved in an existing network.

SUMMARY

To solve the existing technical problem, the embodiment of the disclosure provides a method and access network element device for implementing small cell awakening, and a computer storage medium.

To this end, the technical solutions of the embodiment of the disclosure are implemented as follows.

A method for implementing small cell awakening is provided, including the following steps:

an access network element device receives information, which is reported by User Equipment (UE), of one or more small cells entering dormancy, wherein the information of the one or more small cells entering dormancy includes at least one of current datarate information of the UE, cell types of the small cells, information of supporting modes of the small cells, and broadcast Public Land Mobile Networks (PLMNs) information of the small cells;

the access network element device determines a target small cell required to be awakened according to the information, which is reported by the UE, of the one or more small cells entering dormancy;

the access network element device notifies, through an interface message between access network element devices, an access network element device corresponding to the target small cell to awaken the target small cell.

In an embodiment, the information of the one or more small cells entering dormancy may further include at least one of: RAT (Radio Access Technology)/frequency information, global identifiers of the small cells, routing information of the small cells, and current location information or energy saving indication information of the UE.

In an embodiment, the interface message may be an S1 or X2 interface message.

In an embodiment, the interface message may be implemented by expanding an existing message or a new independent message.

In an embodiment, the access network element device and the access network element device corresponding to the target small cell may be evolved eNBs (eNBs), such as a Femto eNB, a Pico eNB, a Micro eNB and a Metro eNB.

An access network element device for implementing small cell awakening is further provided, including:

a receiving module configured to receive information, which is reported by UE, of one or more small cells entering dormancy, wherein the information of the one or more small cells entering dormancy includes at least one of: current datarate information of the UE, cell types of the small cells, information of supporting modes of the small cells, and broadcast PLMNs information of the small cells;

a processing module configured to determine a target small cell required to be awakened according to the information, which is reported by the UE, of the one or more small cells entering dormancy;

a transmitting module configured to notify, through a ground interface message, an access network element device corresponding to the target small cell to awaken the target small cell.

A computer storage medium is further provided, having stored therein a group of instructions that, when executed, cause at least one processor to perform the aforementioned method for implementing small cell awakening.

Compared with the prior art, the embodiments of the disclosure have the following beneficial effects: the access network element device determines the small cell required to be awakened according to the information, which is reported by the UE, of the dormant small cells. In this way, the awakening of the small cell can be adequately implemented under a small cell network environment. Aiming at various cell types, the method can enable the access network element device to select and awaken an appropriate dormant cell under a complicated small cell network environment according to the information, which is reported by the UE, of the dormant small cells and its relevant information, so that the awakening of the small cell is more effective, and the switching success rate in the network is increased, namely, an appropriate target small cell to be awakened can be accurately determined to avoid unnecessary awakening operation on an interface, and the small cell can share a network load better in a targeted way to favourably improve the network performance.

BRIEF DESCRIPTION OF THE DRAWINGS

The drawings are described here to provide further understanding of the technical solutions of the disclosure and explain the technical solutions of the disclosure with the embodiments of the disclosures, and do not form improper limits to the technical solutions of the disclosure.

DETAILED DESCRIPTION

To make the objects, the technical solutions and the advantages of the disclosure clearer, the technical solutions of the disclosure are described below with reference to the drawings and the specific embodiments in detail, so that the person skilled in the art can better understand and implement the disclosure, but the described embodiments are not intended to limit the disclosure. It should be noted that the embodiments of the disclosure and the characteristics in the embodiments can be combined under the condition of no conflicts.

In various embodiments of the disclosure: an access network element device receives information, which is reported by User Equipment (UE), of one or more small cells entering dormancy; the access network element device determines a target small cell required to be awakened according to the information, which is reported by the UE, of the one or more small cells entering dormancy; the access network element device notifies, through a ground interface message, an access network element device corresponding to the target small cell to awaken the target small cell.

Embodiment 1

Figure 2:
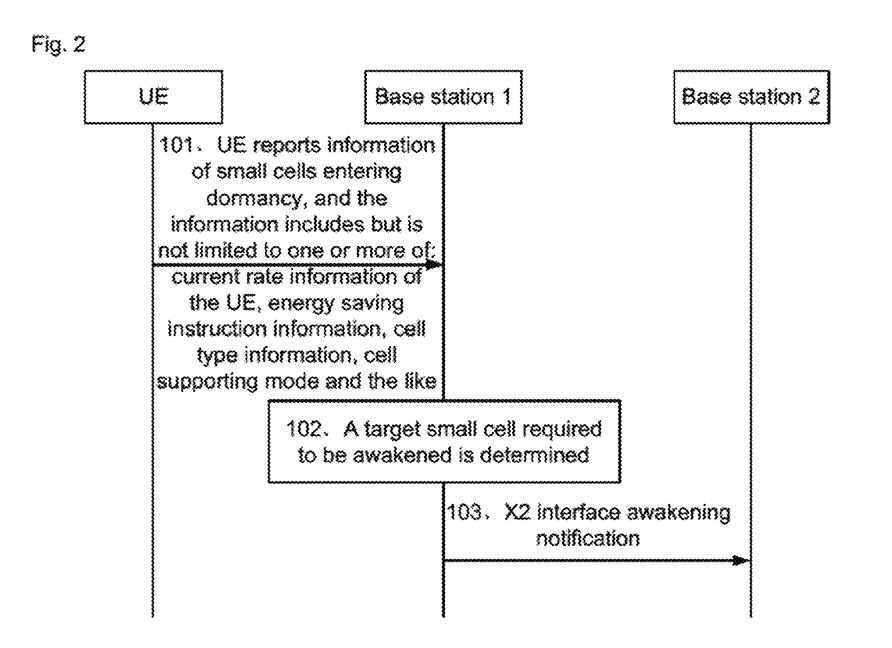
FIG. 2 is a flowchart of a first embodiment of the disclosure.

With reference to FIG. 2, embodiment 1 using the method according to the disclosure is as follows.

After camping on a small cell, UE will leave, in its footprint, relevant information of the small cell, which includes but is not limited to one or more of: EUTRAN Cell Global Identifier (ECGI) information of the small cell, Tracking Area Identity (TAI) information corresponding to the small cell, UE location information at the recording moment, RAT/frequency point information of the small cell, cell type information, and Macro cell signal quality at the recording moment.

Step 101, the UE discovers that a small cell is in an energy saving state through air interface measurement, and an access network element device (an eNB 1) receives information, reported by the UE, of (one or more) small cells entering dormancy;

here, the information of the small cell includes one or more of: RAT/frequency information, the ECGI, routing information of the small cell, current location information of the UE, energy saving indication information, current datarate information of the UE, cell type information, supporting modes of the small cell (such as whether WiFi is supported) and the like;

Step 102, the access network element device (the eNB) determines a target small cell required to be awakened according to the information, reported by the UE, of the small cells entering dormancy;

here, the access network element device (the eNB 1) may acquire the rate information of the UE (that is the current datarate information of the UE) from the reported information of the small cells entering dormancy, and may select a frequency point to awaken a target cell according to the rate information of the UE; for example, for the UE with high rate, a frequency used by a Macro eNB is selected to prevent unnecessary switching of the UE; for the UE with different rates, different types of small cells may be selected, to determine a cell required to be awakened, wherein the UE can calculate its own rate by itself.

The access network element device (the eNB 1) may further perform location information verification on target cells to be awakened, for example, verify whether the target cells to be awakened is in its neighbour list according to the current location information reported by the UE; or under the condition where there is no X2 interface, a Mobility Management Entity (MME) or Gate Way (GW) or target eNB is required to verify the location information, to determine the target small cell required to be awakened.

The access network element device (the eNB 1) may further receive cell supporting mode information transmitted by the UE, and the UE can acquire the cell supporting mode information through system broadcasting or information dedicated to an air interface; the access network element device (the eNB 1) can learn about the user capability and current service information according to the cell supporting mode information to select an appropriate type of small cell required to be awakened. That is, the access network element device can match the UE capability according to a supporting mode of a dormant cell, which is reported by the UE, to finally determine the target small cell required to be awakened.

Step 103, a target eNB (an eNB 2) is notified to awaken the target small cell (the target small cell is not displayed in the figure) through an X2 interface message between eNBs, wherein the target eNB is an access network element device corresponding to the small cell.

Embodiment 2

Figure 3:
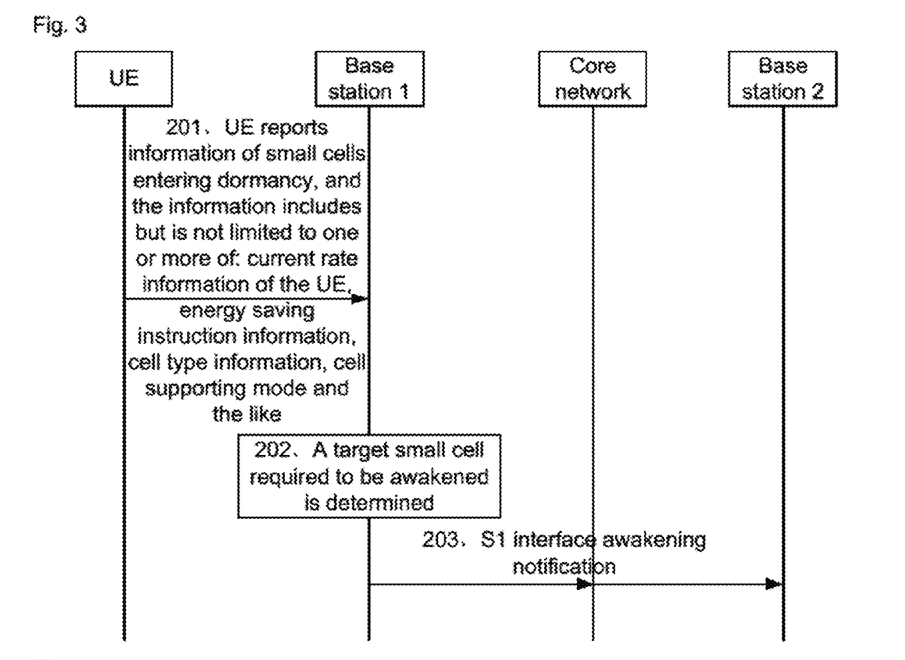
FIG. 3 is a flowchart of a second embodiment of the disclosure.

With reference to FIG. 3, embodiment 2 using the method according to the disclosure is as follows.

After camping on a small cell, UE will leave, in its footprint, relevant information of the small cell, which includes but is not limited to one or more of: ECGI information of the small cell, TAI information corresponding to the small cell, UE location information at the recording moment, RAT/frequency point information of the small cell, cell type information, and Macro cell signal quality at the recording moment.

Step 201, the UE discovers that a small cell is in an energy saving state through air interface measurement, and an access network element device (an eNB 1) receives information of (one or more) small cells entering dormancy from the UE;

here, the information of the small cell includes one or more of: RAT/frequency information, the ECGI, routing information of the small cell, current location information of the UE, energy saving indication information, current datarate information of the UE, cell type information, supporting modes of the small cell (such as whether WiFi is supported) and the like;

Step 202, the access network element device (the eNB 1) determines a target small cell required to be awakened according to the information, reported by the UE, of the small cells entering dormancy;

here, the access network element device (the eNB 1) may acquire the rate information of the UE from the reported information of the small cells entering dormancy, and may select a frequency point to awaken a target cell according to the rate information of the UE: for example, for the UE with high rate, a frequency used by a Macro eNB is selected to prevent unnecessary switching of the UE; for the UE with different rates, different types of small cells may be selected, to determine a cell required to be awakened.

The access network element device (the eNB 1) may further perform location information verification on target cells to be awakened, for example, verify whether the target cells to be awakened is in its neighbour list according to the current location information reported by the UE; or under the condition where there is no X2 interface, an MME or SW or target eNB is required to verify the location information, to determine the target small cell required to be awakened.

The access network element device (the eNB 1) may further receive cell supporting mode information transmitted by the UE, and the UE can acquire the cell supporting mode information through system broadcasting or information dedicated to an air interface; the access network element device (the eNB 1) can learn about the user capability and current service information according to the cell supporting mode information to select an appropriate type of small cell required to be awakened. That is, the access network element device can match the UE capability according to a supporting mode of a dormant cell, which is reported by the UE, to finally determine the target small cell required to be awakened.

Of course, the access network element device can determine the final target small cell required to be awakened according to one or several pieces of the received information such as current datarate information of the UE, the cell type information and the cell supporting mode.

Step 203, a target eNB (an eNB 2) is notified through an S1 interface message (a message for determining the target small cell) via a core network to awaken the target small cell.

Embodiment 3

Figure 4:
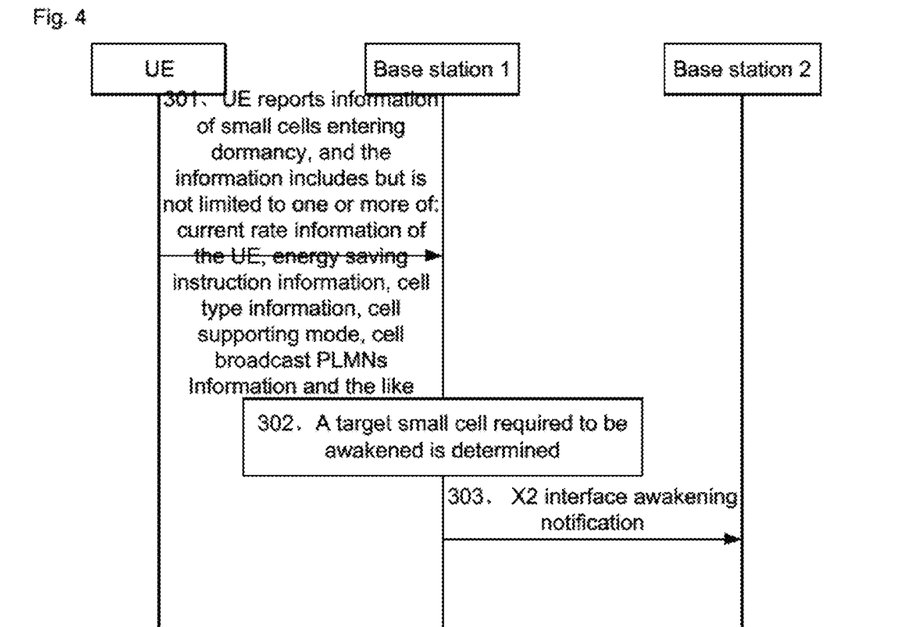
FIG. 4 a flowchart of a third embodiment of the disclosure.

With reference to FIG. 4, embodiment 3 using the method according to the disclosure is as follows After camping on a small cell, UE will leave, in its footprint, relevant information of the small cell, which includes but is not limited to one or more of ECGI information of the small cell, TAI information corresponding to the small cell, UE location information at the recording moment, frequency/frequency point information of the small cell, cell type information, and Macro cell signal quality at the recording moment.

Step 301, the UE discovers that a small cell is in an energy saving state through air interface measurement, and an access network element device (an eNB 1) receives information of (one or more) small cells entering dormancy from the UE;

here, the information of the small cell includes one or more of; RAT/frequency information, the ECGI, routing information of the small cell, current location information of the UE, energy saving indication information, current datarate information of the UE, cell type information, supporting modes of the small cell (such as whether WIFI is supported), cell broadcast PLMNs information and the like;

Step 302, the access network element device (the eNB 1) determines a target small cell required to be awakened according to the information, reported by the UE, of the small cells entering dormancy:

here, the access network element device (the eNB 1) may acquire the rate information of the UE from the reported information of the small cells entering dormancy, and may select a frequency point to awaken a target cell according to the rate information of the UE; for example, for the UE with high rate, a frequency used by a Macro eNB is selected to prevent unnecessary switching of the UE; for the UE with different rates, different types of small cells may be selected, to determine a cell required to be awakened.

The access network element device (the eNB 1) may further perform location information verification on target cells to be awakened, for example, verify whether the target cells to be awakened is in its neighbour list according to the current location information reported by the UE: or under the condition where there is no X2 interface, an MME or GW or target eNB is required to verify the location information, to determine the target small cell required to be awakened.

The access network element device (the eNB may further receive cell supporting mode information transmitted by the UE, and the UE can acquire the cell supporting mode information through system broadcast or information dedicated to an air interface; the access network element device (the eNB 1) can learn about the user capability and current service information according to the cell supporting mode information to select an appropriate type of small cell required to be awakened. That is, the access network element device can match the UE capability according to a supporting mode of a dormant cell, which is reported by the UE, to determine the target small cell required to be awakened.

The access network element device may also match the cell broadcasting PLMNs information reported by the UE with a serving PLMN allowed to be accessed by the UE and equivalent PLMNs information, to select a target small cell supporting user access under a network sharing environment; the UE can acquire the cell broadcasting PLMNs information through system broadcasting, so that the access network element device can determine the target small cell required to be awakened according to this information.

Of course, the access network element device can determine the final target small cell required to be awakened according to one or several pieces of the received information such as the current datarate information of the UE, the cell type information, the cell supporting mode and the cell broadcasting PLMNs information.

Step 303, a target eNB (an eNB 2) is notified through an X2 interface message between eNBs to awaken the target small cell.

Embodiment 4

Figure 5:
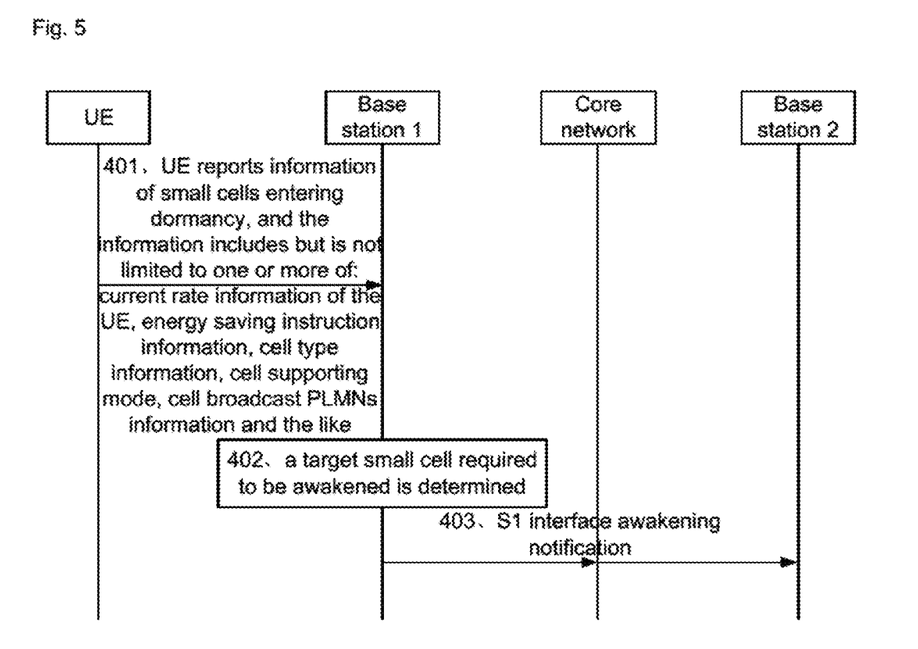
FIG. 5 is a flowchart of a fourth embodiment of the disclosure.

With reference to FIG. 5, embodiment 4 using the method according to the disclosure is as follows.

After camping on a small cell, UE will leave, in its footprint, relevant information of the small cell, which includes but is not limited to one or more of; ECGI information of the small cell, TAI information corresponding to the small cell, UE location information at the recording moment, RAT/frequency point information of the small cell, cell type information, and Macro cell signal quality at the recording moment.

Step 401, the UE discovers that a small cell is in an energy saving state through air interface measurement, and an access network element device (an eNB 1) receives information of (one or more) small cells entering dormancy;

here, the information of the small cell includes one or more of RAT/frequency information, the ECGI, routing information of the small cell, current location information of the UE, energy saving indication information, current datarate information of the UE, cell type information, supporting modes of the small cell (such as whether WiFi is supported), cell broadcast PLMNs information and the like;

Step 402, the access network element device (the eNB 1) determines a target small cell required to be awakened according to the information, reported by the UE, of the small cells entering dormancy;

here, the access network element device (the eNB 1) may acquire the rate information of the UE from the reported information of the small cells entering dormancy, and may select a frequency point to awaken a target cell according to the rate information of the UE; for example, for the UE with high rate, a frequency used by a Macro eNB is selected to prevent unnecessary switching of the UE; for the UE with different rates, different types of small cells may be selected; and/or, the access network element device may perform location information verification on target cells to be awakened, for example, verify whether the target cells to be awakened is in a neighbour list according to the current location information reported by the UE; and/or, the UE capability is matched according to the dormant cell supporting mode reported by the UE; and/or, the access network element device can match the reported cell broadcasting PLMNs information with a serving PLMN allowed to be accessed by the UE and equivalent PLMNs information, to select a target small cell supporting user access under a network sharing environment, so that the target small cell required to be awakened can be finally determined.

Step 403, a core network notifies a target eNB (an eNB 2) through an S1 interface message to awaken the target small cell.

Figure 6:
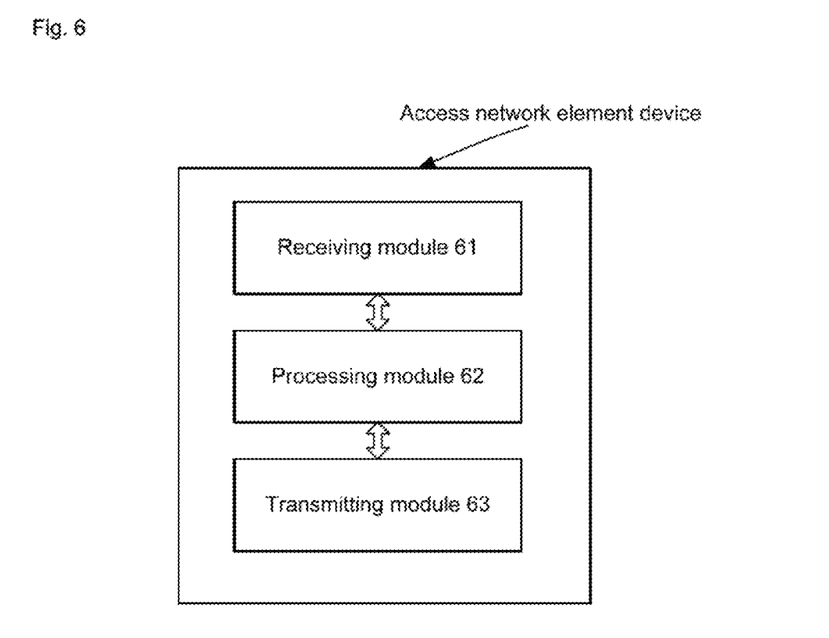
FIG. 6 is a structural diagram of an access network element device according to an embodiment of the disclosure.

To implement the method, the embodiment of the disclosure further provides an access network element device for implementing small cell awakening. As shown in FIG. 6, the access network element device includes:

a receiving module 61 configured to receive information, which is reported by UE, of one or more small cells entering dormancy, wherein the information of one or more small cells entering dormancy includes at least one of: current datarate information of the UE, cell types of the small cells, information of supporting modes of the small cells, and broadcast PLMNs information of the small cells;

a processing module 62 configured to determine a target small cell required to be awakened according to the information, which is reported by the UE, of the small cells entering dormancy;

a transmitting module 63 configured to notify, through a ground interface message, an access network element device corresponding to the target small cell to awaken the target small cell.

Specifically, the processing module 62 may select a frequency point to awaken a target cell according to the current datarate information of the UE in the reported information of the small cells entering dormancy; for example, for the UE with high rate, a frequency used by a Macro eNB is selected to prevent unnecessary switching of the UE; for the UE with different rates, the processing module 62 can select the different types of small cells; and/or, the processing module 62 may perform location information verification on target cells to be awakened, for example, verify whether the target cells to be awakened is in its neighbour list according to the current location information reported by the UE; and/or, the UE capability is matched according to the dormant cell supporting mode reported by the UE; and/or, the processing module 62 can match the reported cell broadcasting PLMNs information with a serving PLMN allowed to be accessed of the UE and equivalent PLMNs information, to select a target small cell supporting user access under a network sharing environment, so that the target small cell required to be awakened can be finally determined.

In actual applications, the receiving module 61 and the transmitting module 63 can be implemented by a transceiver in the access network element device for implementing small cell awakening; the processing module 62 can be implemented by a Central Processing Unit (CPU), a Digital Signal Processor (DSP) or a Field-Programmable Gate Array (FPGA) in the access network element device for implementing small cell awakening.

The interface message can be either an S1 or X2 interface message.

In an embodiment, the X2 interface message or the S1 interface message mentioned in the first to fourth embodiments can be either implemented by expanding an existing message or a new independent message.

In an embodiment, the method is not limited to be applied to a Long Term Evolution (LTE) system; in a 2G or 3G system or under the condition of a cross-system, notification of small cell awakening is implemented by a direct or indirect interface between base stations; the direct interface is a direct interface between the base stations among cross-systems or between Radio Network Controllers (RNC); notification of small cell awakening implemented by the indirect interface refers to notification of small cell awakening by performing message forwarding through a core network between the base stations among the cross-systems or between the RNCs.

Herein, the access network element device mentioned in each embodiment is an access network element device under the current small cell network environment, such as a Macro eNB, a Femto eNB, a PICO eNB, a MICRO eNB and a Metro eNB; the target eNB mentioned in each embodiment is an access network element device corresponding to the small cell, and the target eNB can also be a Macro eNB, a Femto eNB, a PICO eNB, a MICRO eNB, a Metro eNB and the like.

In all the embodiments, the more varieties of messages included in the information of the dormant small cells (such as the RAT/frequency information, the ECGI, the current datarate information of the UE and the cell type information), which are transmitted by the UE to the access network element device, the more favourable for the access network element device to determine the target small cell required to be awakened.

The person skilled in the art should understand that the embodiment of the disclosure can provide a method, a system or a computer program product. Therefore, the disclosure can adopt forms such as a hardware embodiment, a software embodiment, or a software and hardware embodiment. Furthermore, the disclosure can adopt a form of a computer program product implemented on a computer available storage medium (including but not limited to a magnetic disk memory, an optical memory and the like) including a computer available program code.

The disclosure is described with reference to the flowcharts and/or block diagrams of the method, the device (system) and the computer program product according to the embodiment of the disclosure. It should be understood that a computer program instruction implements each flow and/or each block in the flowcharts and/or the block diagrams, and combination of the flows and/or the blocks in the flowcharts and/or the block diagrams. These computer program instructions can be provided for a general computer, a special computer, an embedded type processing unit or processor of other programmable data processing device, to generate a machine, so that an apparatus for implementing functions appointed in one flow or multiple flows of the flowcharts and/or one block or multiple blocks of the block diagrams is generated by instructions executed by computers or processors of other programmable data processing devices.

These computer program instructions may be stored in computer readable memories capable of guiding computers or other programmable data processing devices to work in a specific way, so that the instructions stored in the computer readable memories generate products including instruction devices; the instruction devices implement the functions appointed one flow or multiple flows of the flowcharts and/or one block or multiple blocks of the block diagrams.

These computer program instructions may be loaded to the computers or other programmable data processing devices, so that a series of operating steps are executed on the computers or other programmable devices to generate processing implemented by the computers, and the instructions executed on the computers or other programmable devices provide steps for implementing the functions appointed in one flow or multiple flows of the flowcharts and/or one block or multiple blocks of the block diagrams.

Although the implementation modes of the disclosure are as shown above, the contents are only implementation modes adopted to facilitate the understanding of the disclosure, and are not intended to limit the disclosure. Any person skilled in the art can make any modifications and variations to the implementation forms and details of the disclosure without departing from the spirit and scope of the disclosure, but the scope of protection of the disclosure still depends on the scope defined by the attached claims.

What is claimed is:

1. A method for implementing small cell awakening, comprising:
   receiving, by an access network element device, information, which is reported by User Equipment (UE), of one or more small cells entering dormancy, wherein the information of the one or more small cells entering dormancy comprises at least one of: current datarate information of the UE, cell types of the small cells, information of supporting modes of the small cells, and broadcast Public Land Mobile Networks (PLMNs) information of the small cells;
   determining, by the access network element device, a target small cell required to be awakened according to the information, which is reported by the UE, of the one or more small cells entering dormancy; and
   notifying, by the access network element device through an interface message between access network element devices, an access network element device corresponding to the target small cell to awaken the target small cell,
   wherein determining, by the access network element device, the target small cell required to be awakened according to the information, which is reported by the UE, of the one or more small cells entering dormancy comprises at least one of:
   selecting, by the access network element device, a frequency point to awaken a target cell according to the current datarate information of the UE to determine the target small cell required to be awakened;
   performing, by the access network element device, location information verification on target cells to be awakened to determine the target small cell required to be awakened;

matching, by the access network element device, the UE capability according to the information of supporting modes of the small cells, which is reported by the UE, to determine the target small cell required to be awakened; or matching, by the access network element device, the broadcast PLMNs information with a serving PLMN allowed to be accessed by the UE and equivalent PLMNs information, and then selecting a target small cell supporting user access under a network sharing environment to determine the target small cell required to be awakened.

2. The method according to claim 1, wherein the information of the one or more small cells entering dormancy further comprises at least one of: RAT/frequency information, global identifiers of the small cells, routing information of the small cells, and current location information or energy saving indication information of the UE.

3. The method according to claim 1, wherein the interface message is an S1 or X2 interface message.

4. The method according to claim 1, wherein the interface message is implemented by expanding an existing message or a new independent message.

5. The method according to claim 1, wherein the access network element device and the access network element device corresponding to the target small cell are evolved NodeBs (eNBs).

6. An access network element device for implementing small cell awakening, comprising:

a receiving module configured to receive information, which is reported by User Equipment (UE), of one or more small cells entering dormancy, wherein the information of one or more small cells entering dormancy comprises at least one of: current datarate information of the UE, cell types of the small cells, information of supporting modes of the small cells, and broadcast Public Land Mobile Networks (PLMNs) information of the small cells;

a processing module configured to determine a target small cell required to be awakened according to the information, which is reported by the UE, of the one or more small cells entering dormancy; and a transmitting module configured to notify, through an interface message between access network element devices, an access network element device corresponding to the target small cell to awaken the target small cell, wherein in order to determine the target small cell required to be awakened according to the information, which is reported by the UE, of the one or more small cells entering dormancy, the processing module is configured to perform at least one of:

selecting a frequency point to awaken a target cell according to the current datarate information of the UE to determine the target small cell required to be awakened;

performing location information verification on target cells to be awakened to determine the target small cell required to be awakened;

matching the UE capability according to the information of supporting modes of the small cells, which is reported by the UE, to determine the target small cell required to be awakened; or matching the broadcast PLMNs information with a serving PLMN allowed to be accessed by the UE and equivalent PLMNs information, and then selecting a target small cell supporting user access under a network sharing environment to determine the target small cell required to be awakened.

7. The access network element device according to claim 6, wherein the information of the one or more small cells entering dormancy further comprises at least one of: RAT/frequency information, global identifiers of the small cells, routing information of the small cells, and current location information or energy saving indication information of the UE.

8. The access network element device according to claim 6, wherein the interface message is an S1 or X2 interface message.

9. The access network element device according to claim 6, wherein the interface message is implemented by expanding an existing message or a new independent message.

10. The access network element device according to claim 6, wherein the access network element device and the access network element device corresponding to the target small cell are evolved NodeBs (eNBs).

11. A non-transitory computer storage medium having stored therein a group of instructions that, when executed, cause at least one processor to perform a method for implementing small cell awakening, the method comprising:

receiving, by an access network element device, information, which is reported by User Equipment (UE), of one or more small cells entering dormancy, wherein the information of the one or more small cells entering dormancy comprises at least one of: current datarate information of the UE, cell types of the small cells, information of supporting modes of the small cells, and broadcast Public Land Mobile Networks (PLMNs) information of the small cells;

determining, by the access network element device, a target small cell required to be awakened according to the information, which is reported by the UE, of the one or more small cells entering dormancy; and notifying, by the access network element device through an interface message between access network element devices, an access network element device corresponding to the target small cell to awaken the target small cell, wherein determining, by the access network element device, the target small cell required to be awakened according to the information, which is reported by the UE, of the one or more small cells entering dormancy comprises at least one of:

selecting, by the access network element device, a frequency point to awaken a target cell according to the current datarate information of the UE to determine the target small cell required to be awakened;

performing, by the access network element device, location information verification on target cells to be awakened to determine the target small cell required to be awakened;

matching, by the access network element device, the UE capability according to the information of supporting modes of the small cells, which is reported by the UE, to determine the target small cell required to be awakened; or matching, by the access network element device, the broadcast PLMNs information with a serving PLMN allowed to be accessed by the UE and equivalent PLMNs information, and then selecting a target small cell supporting user access under a network sharing environment to determine the target small cell required to be awakened.

* * * * *